United States Patent [19]
Kehrney

[11] Patent Number: 5,497,837
[45] Date of Patent: Mar. 12, 1996

[54] APPARATUS FOR CONTROLLING DOWN PRESSURE ON AGRICULTURAL IMPLEMENTS

[75] Inventor: Barry R. Kehrney, Thamesville, Canada

[73] Assignee: Dawn Equipment Company, Sycamore, Ill.

[21] Appl. No.: 221,250

[22] Filed: Mar. 31, 1994

[51] Int. Cl.[6] ............................................. A01C 5/06
[52] U.S. Cl. ..................... 172/619; 111/66; 111/52; 172/311
[58] Field of Search ................. 37/190; 56/275, 56/119, 330; 111/52, 66, 134, 135, 137, 186, 194, 924, 926, 927; 172/311, 456, 619, 620

[56] References Cited

U.S. PATENT DOCUMENTS

| | | | |
|---|---|---|---|
| 3,635,495 | 1/1972 | Orendorff | 111/927 X |
| 4,149,475 | 4/1979 | Bailey et al. | 111/927 X |
| 4,191,262 | 3/1980 | Sylvester | 111/927 X |
| 4,377,979 | 3/1983 | Peterson et al. | 111/927 X |
| 4,528,920 | 7/1985 | Neumeyer | 111/194 X |
| 5,346,019 | 9/1994 | Kinzenbaw et al. | 172/311 |

Primary Examiner—Terry Lee Melius
Assistant Examiner—Robert Pezzuto
Attorney, Agent, or Firm—Arnold, White & Durkee

[57] ABSTRACT

A soil treatment apparatus is provided having a main frame to be drawn by a towing vehicle over subjacent soil, a subframe, a structure for mounting the subframe to the main frame for vertical movement relative thereto between first and second position, and structure for attaching a plurality of soil treating implements to the subframe to follow movement of the subframe between the first and second positions.

20 Claims, 10 Drawing Sheets

APPARATUS FOR CONTROLLING DOWN PRESSURE ON AGRICULTURAL IMPLEMENTS

BACKGROUND OF THE INVENTION

1. Field of the Invention

This invention relations to agricultural implements for treating soil and, more particularly, to an apparatus for supporting agricultural implements and for controlling down pressure on the implements to allow for uniform depth treatment in soils of different consistency.

2. Background Art

It is known to gang mount agricultural implements on a frame so that the implements simultaneously treat underlying soil along laterally spaced rows as the frame is towed. It is also known to apply a variable down pressure on the individual implements. In one form, each implement is carried on one end of an arm that is pivotably connected to a stem, depending from the frame, for movement about a horizontal axis. The opposite end of the arm is acted upon by a spring which biases the arm so that the associated implement is forced downwardly against the underlying soil with a predetermined force.

In one exemplary system, individual coulter wheels are provided on the frame. Each coulter wheel may have an associated fertilizer applicator and/or a trailing tine to open a slot therebehind. Ideally, the fertilizer is applied to the soil at a depth of approximately two inches below the anticipated seed depth. The seed is thereafter planted ideally at a constant depth throughout the field to produce a uniform crop yield and thereby maximize field output.

It is not uncommon for the down pressure on the implements to be set and maintained at one level as the entire field is treated, even though the consistency of the soil may vary throughout the field. To avoid zero production spots throughout the field, the agricultural implements are set to penetrate the hardest soil to be encountered in the field. It is not uncommon for the down pressure on the implements to be set on the order of-300–500 pounds for this purpose.

While the implements urged downwardly with a large force effectively penetrate hardened soil to a desired depth, the implements under this same down pressure penetrate to excessive depths in softer and looser soft.

The user is thus faced with the options of either treating the soil to different depths with a constant down pressure setting or periodically adjusting the down pressure on the implements. This latter option may not be feasible given that numerous adjustments may be required over a given field. Most conventional implements do not lend themselves to simple down pressure adjustment, which makes this task onerous. Even on systems in which the adjustment is facilitated, adjustment is complicated by having to adjust the down pressure on the implements one by one. It is also difficult to set all implements to the same down pressure.

In one such arrangement, a ratchet mechanism is employed. A toothed element cooperates with a translatable rack on the implement stem and is rotatable to set the desired down pressure, with a greater down pressure being used in harder soil and a lesser down pressure being used in softer soil.

Another known system for applying variable down pressure uses a two or four bar linkage which allows the implements to float relative to a fixed frame to which the implements attach. Springs are mounted to the linkage to load the associated implements with a predetermined down pressure. If down pressure is to be adjusted through reorientation of the spring, this must be done for each implement. It is a tedious job to effect this adjustment. Still further, the adjustments become relatively crude and inconsistent from one implement to the next. Also, the links and adjusting mechanisms are prone to detrimental wear, particularly after repeated adjustments are made.

It is also known to reconfigure a frame upon which the implements are mounted to alter the down pressure simultaneously for a group of the implements. In one such prior art device, an intermediate frame assembly is drawn behind the towing vehicle. The intermediate frame has cooperating parts which relatively move in a scissors-like action to selectively raise and lower the implements to vary down pressure. This type of mechanism has a number of drawbacks.

First of all, the structure that allows reconfiguring of the frame is relatively complicated. Increased expense and likelihood of malfunction flow from complex mechanisms, particularly those which are required to withstand the severe environment encountered in the agricultural industry.

Another problem with this scissors-type mechanism is that it is controllable through a wide range of pressures, with there being no way to consistently select and maintain a desired down pressure in hard and soft soils. The user is required to roughly set a desired pressure for different soil conditions. As a result, there may be significant variation in the operating depth for the implements.

Still further, the intermediate frame does not track accurately behind the towing vehicle so that the lines of treatment of upstream and downstream implements may not coincide. It is also known to physically pile weights onto an implement supporting frame to increase down pressure. This is obviously a difficult, time-consuming, and crude manner of adjusting down pressure.

SUMMARY OF THE INVENTION

In one form of the invention, a soil treatment apparatus is provided having a main frame to be drawn by a towing vehicle over subjacent soil, a subframe, structure for mounting the subframe to the main frame for vertical movement relative thereto between first and second position, and structure for attaching a plurality of soil treating implements to the subframe to follow movement of the subframe between the first and second positions.

With the inventive structure, the vertical position of the subframe and plurality of implements can be simultaneously changed relative to the main frame.

The subframe can be mounted for translatory movement between the first and second positions.

The invention contemplates the above structure in combination with a first soil treating implement. The structure for attaching the first soil treating implement may include a mounting stem assembly depending from the subframe, with there being structure on at least one of the mounting stem assembly and subframe for biasably urging the first soil treating implement downwardly with a predetermined force.

The soil treating implements can take any of a number of different forms. As one example, the soil treating implements could include a coulter wheel and/or structure for applying an additive into the subjacent soil.

The invention further contemplates structure cooperating between the main frame and subframe for moving the subframe between its first and second positions.

This moving structure can take a number of different forms. In one form, first and second laterally spaced actuators are provided. The actuators may be hydraulically or pneumatically operated either at the side of the actuator or from a location remote therefrom, as from the cab of a towing vehicle.

Structure cooperating between the subframe and main frame can be provided to limit vertical movement of the subframe relative to the main frame.

In a preferred form, vertical movement of the subframe is limited both in a raised position and in a lowered position.

In another form, the structure for limiting vertical movement is such that at least one of the raised and lowered positions, in which movement of the subframe is limited, can be changed.

In one form of the invention, the soil treatment apparatus has a front and rear and laterally spaced sides and the subframe includes first and second laterally extending, elongate beams which are spaced from each other in a fore and aft direction. A plurality of soil treating implements may be attached to each of the beams.

To guide relative movement between the main frame and the subframe, at least one vertically extending surface can be provided on the main frame. The subframe is guided against the vertically extending surface as it moves between raised and lowered positions.

The main frame preferably includes a tongue which attaches to a towing vehicle. The tongue can project in a fore and aft direction through the beam(s) on the subframe or, alternatively, can abut to the subframe to limit downward and/or upward movement thereof.

The invention further contemplates a subframe assembly for a plurality of agricultural implements, which subframe assembly has a beam, structure for attaching a plurality of soil treating implements to the beam to follow movement of the beam, and structure for attaching the beam to a main frame for movement of the beam vertically relatively to the main frame.

The invention further contemplates the soil treatment apparatus in combination with a plurality of structures for planting seed in subjacent soil, with the seed planting structures being attached to at least one of the subframe and main frame to follow movement thereof in side-by-side relationship.

DETAILED DESCRIPTION OF THE DRAWINGS

Figure 1:
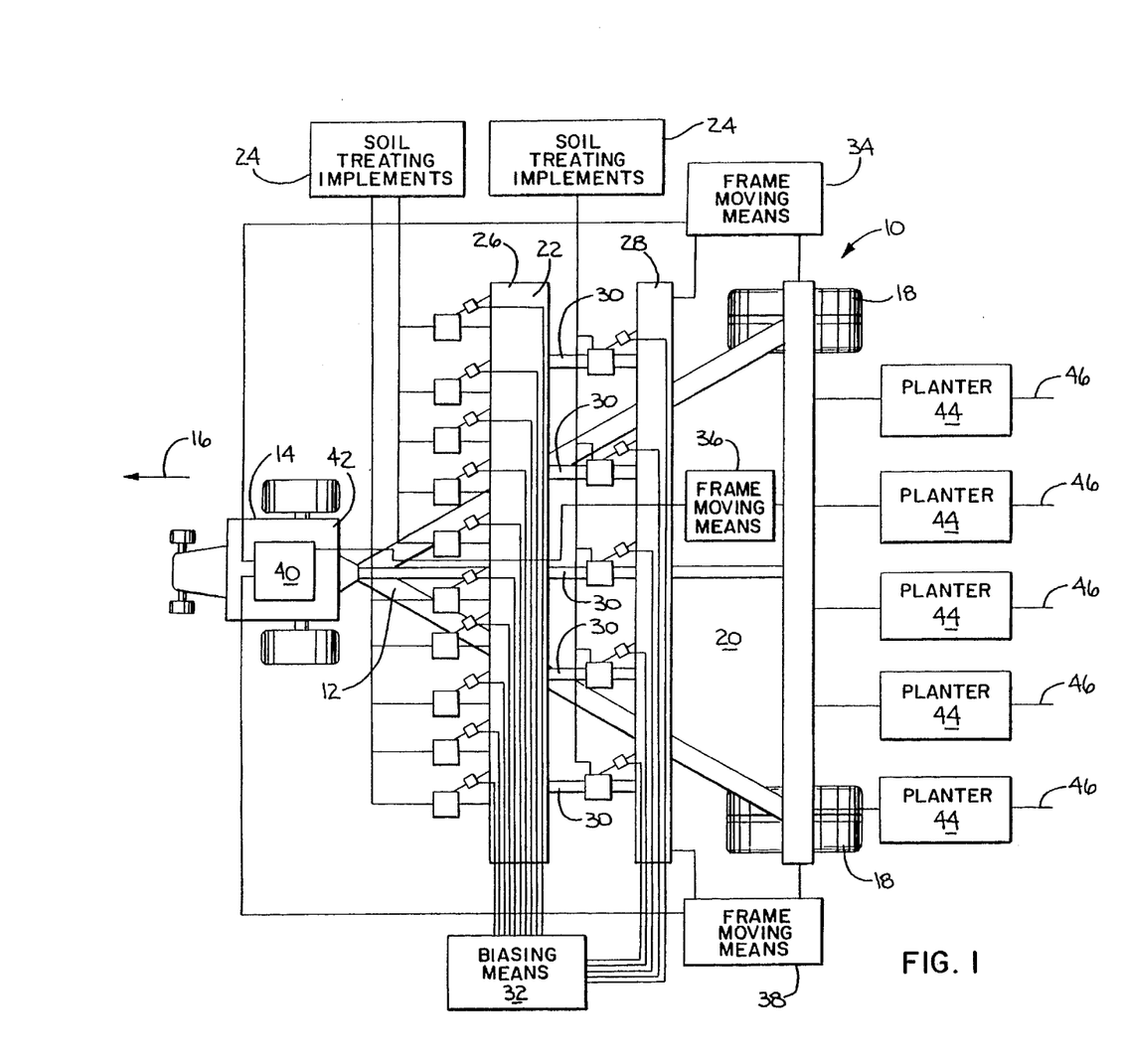
FIG. 1 is a schematic plan view of a planting system including a towing vehicle and a soil treatment apparatus, according to the present invention, being drawn by the towing vehicle.

In FIG. 1, one form of soil treatment apparatus, according to the present invention, is shown schematically at 10. The soil treatment apparatus 10 includes a main frame 12 which attaches to and is drawn by a towing vehicle 14 in a forward direction, as indicated by the arrow 16. The main frame has laterally spaced pairs of wheels 18 which support the frame 12 in an elevated position and allow the frame 12 to traverse underlying soil 20, which is to be treated.

The soil treatment apparatus 10 includes a subframe 22, to which a plurality of soil treating implements 24 are attached. The subframe 22 has front and rear elongate beams 26,28, respectively, which beams extend in a lateral direction and each support a plurality of the soil treating implements 24 which are spaced strategically in a lateral direction. The beams 26,28 are interconnected by braces 30 so that the beams 26,28 and braces 30 cooperatively define a rigid, unitary structure from which the implements 24 depend.

The precise construction of the implements 24 is not critical to the present invention. As one example, the implements 24 could be coulter wheels, as shown in greater detail in other Figures, with an associated fertilizer applicator. A biasing means 32 acts between the subframe 22 and implements 24 to exert a predetermined down pressure on the implements 24.

The invention contemplates that the subframe 22 be selectively movable vertically relative to the main frame 12 to allow simultaneous variation of the riding height of a plurality of the soil treating implements 24, which has the same effect as varying the down pressure exerted by the implements 24 upon the subjacent soil 20.

To accomplish this, means 34,36,38 are provided to act between the main frame 12 and subframe 22 to move the subframe between raised and lowered positions. As explained in greater detail below, the means 34,36,38 may be conventional pneumatic or hydraulic actuators which are simultaneously operable through a controller 40 in the cab 42 of the towing vehicle 14.

The invention further contemplates the attachment of planters 44 in side-by-side relationship in trailing relationship to the main frame 12. The planters 44 have a conventional construction and structure thereon for continuously creating a seed slot in the soil worked by the implements 24, introducing seed, and closing the slot in seed rows 46 defined in the soil 20.

Reference is initially made to FIGS. 2, 3, 11 and 12, wherein one specific form of soil treatment apparatus is shown at 50. The soil treatment apparatus 50 has a subframe 22' that is defined by a single, laterally extending beam 52 to which the soil treating implements 24 are attached. The soil treating implements 24 are shown as coulter wheels.

Figure 2:
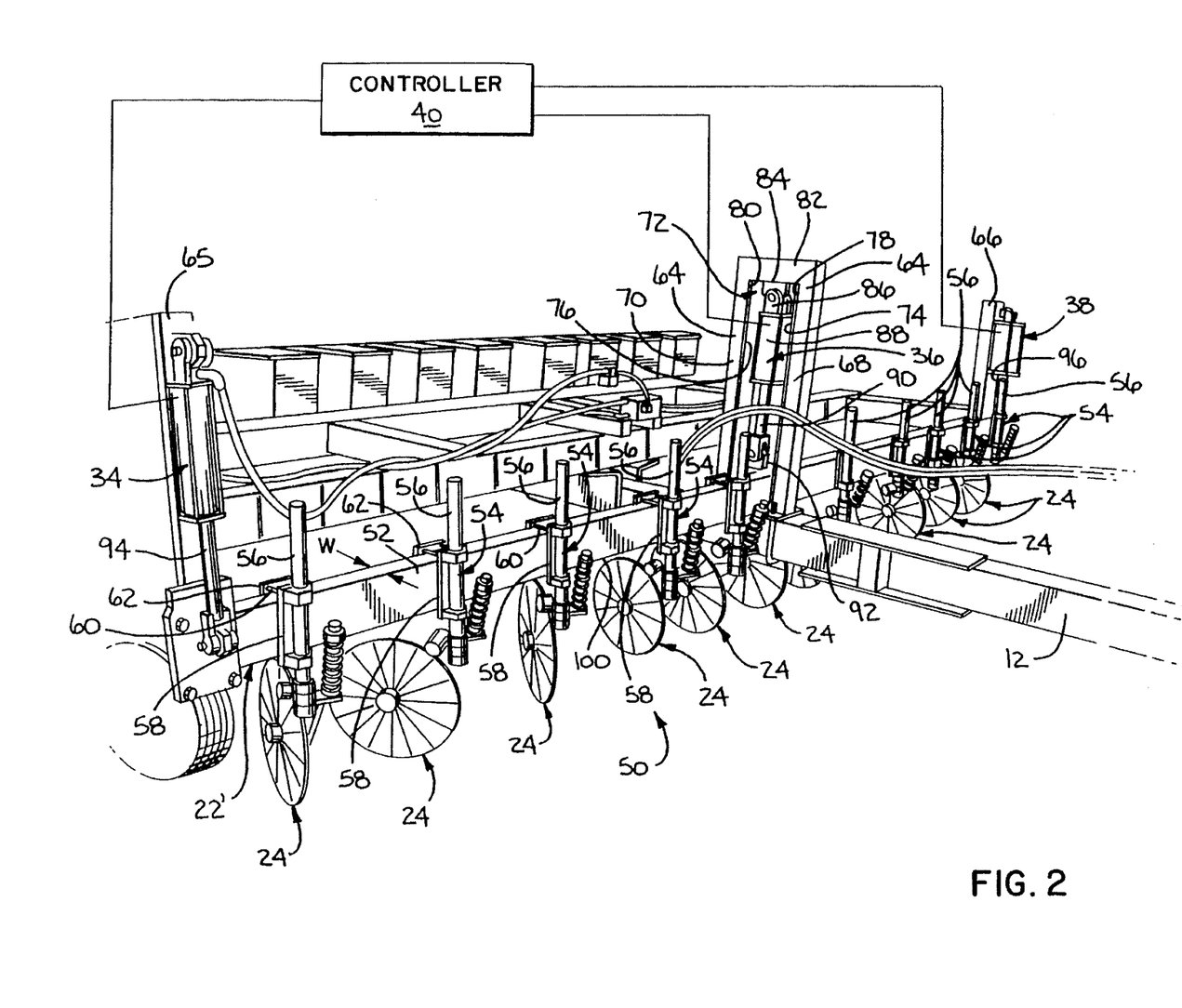
FIG. 2 is a left front perspective view of a portion of one form of soil treatment apparatus, according to the present invention.
Figure 3:
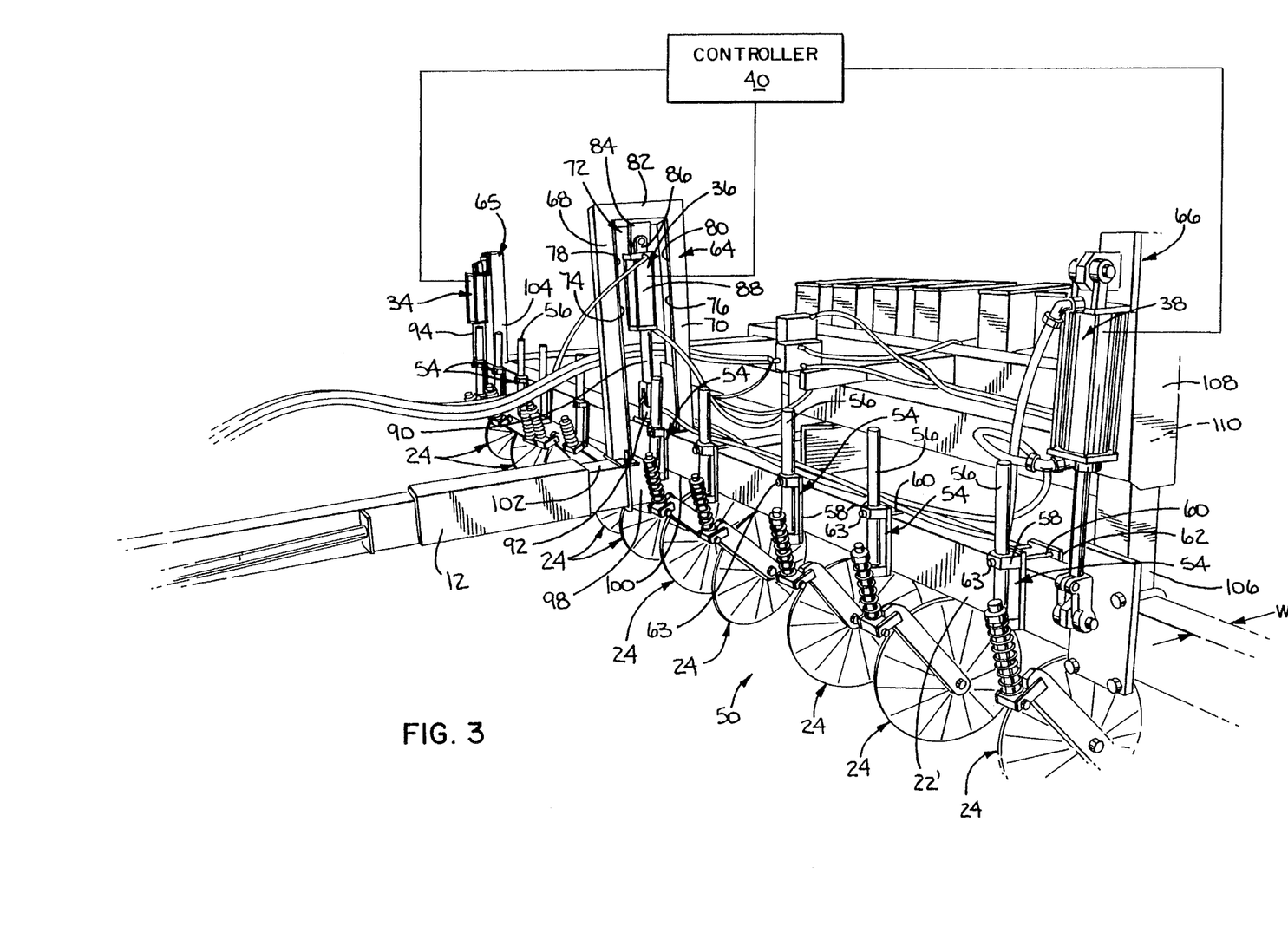
FIG. 3 is a right front perspective view of a portion of the soil treatment apparatus of FIG. 2.
Figure 4:
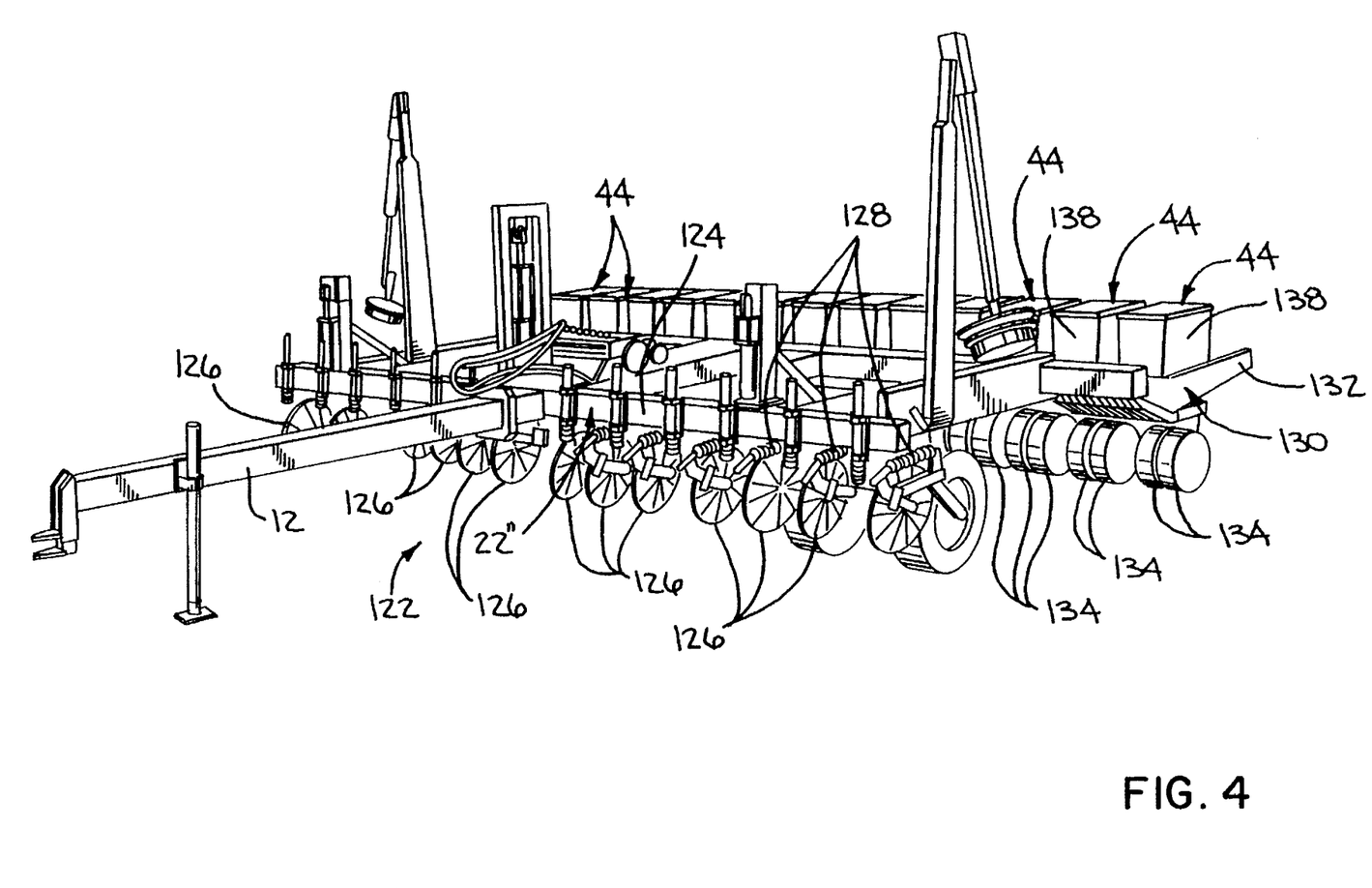
FIG. 4 is a right front perspective view of a modified form of soil treatment apparatus according to the present invention.
Figure 5:
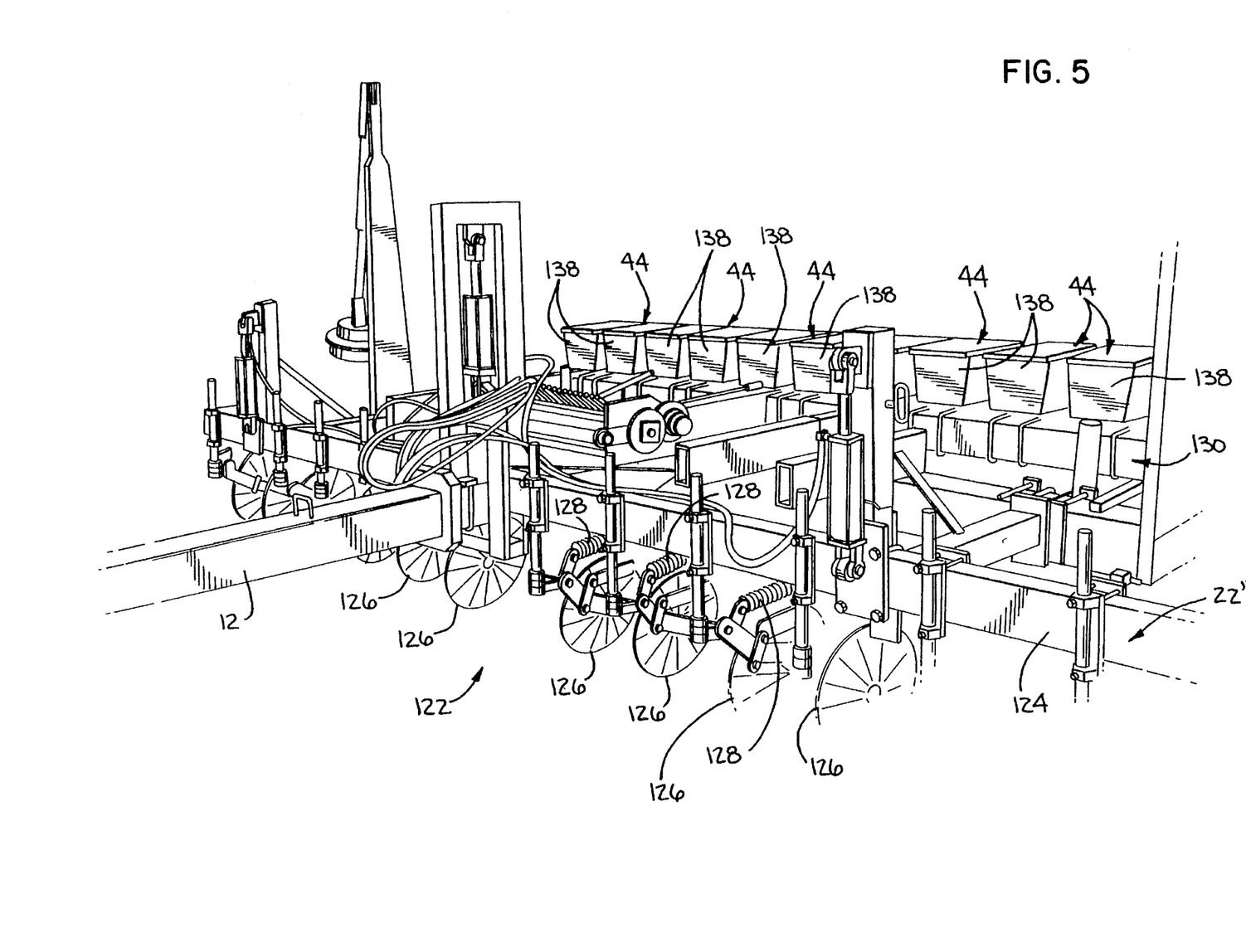
FIG. 5 is a right front perspective view of a portion of the soil treatment apparatus of FIG. 4.
Figure 6:
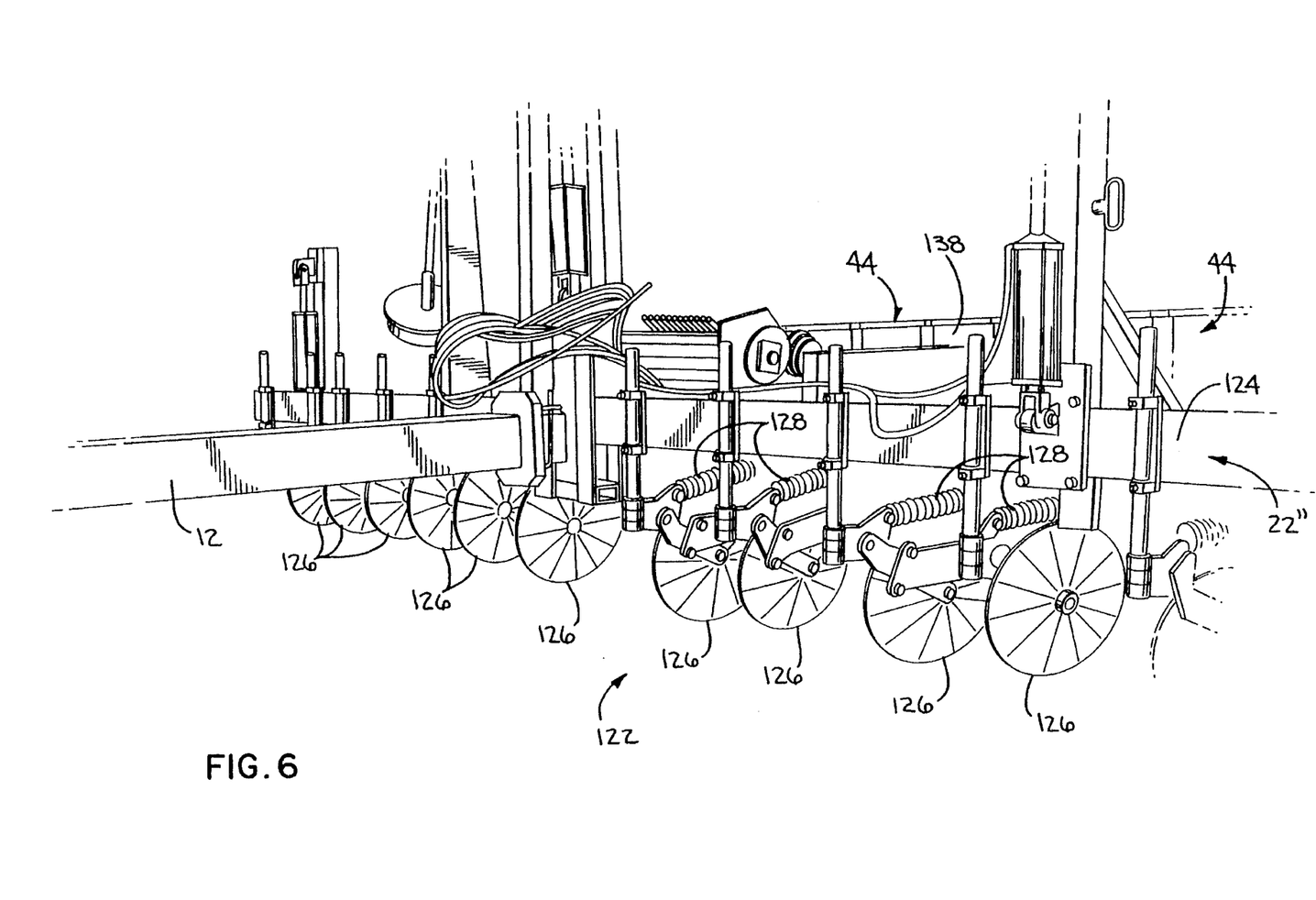
FIG. 6 is right front perspective view of a portion of the soil treatment apparatus of FIGS. 4 and 5.
Figure 7:
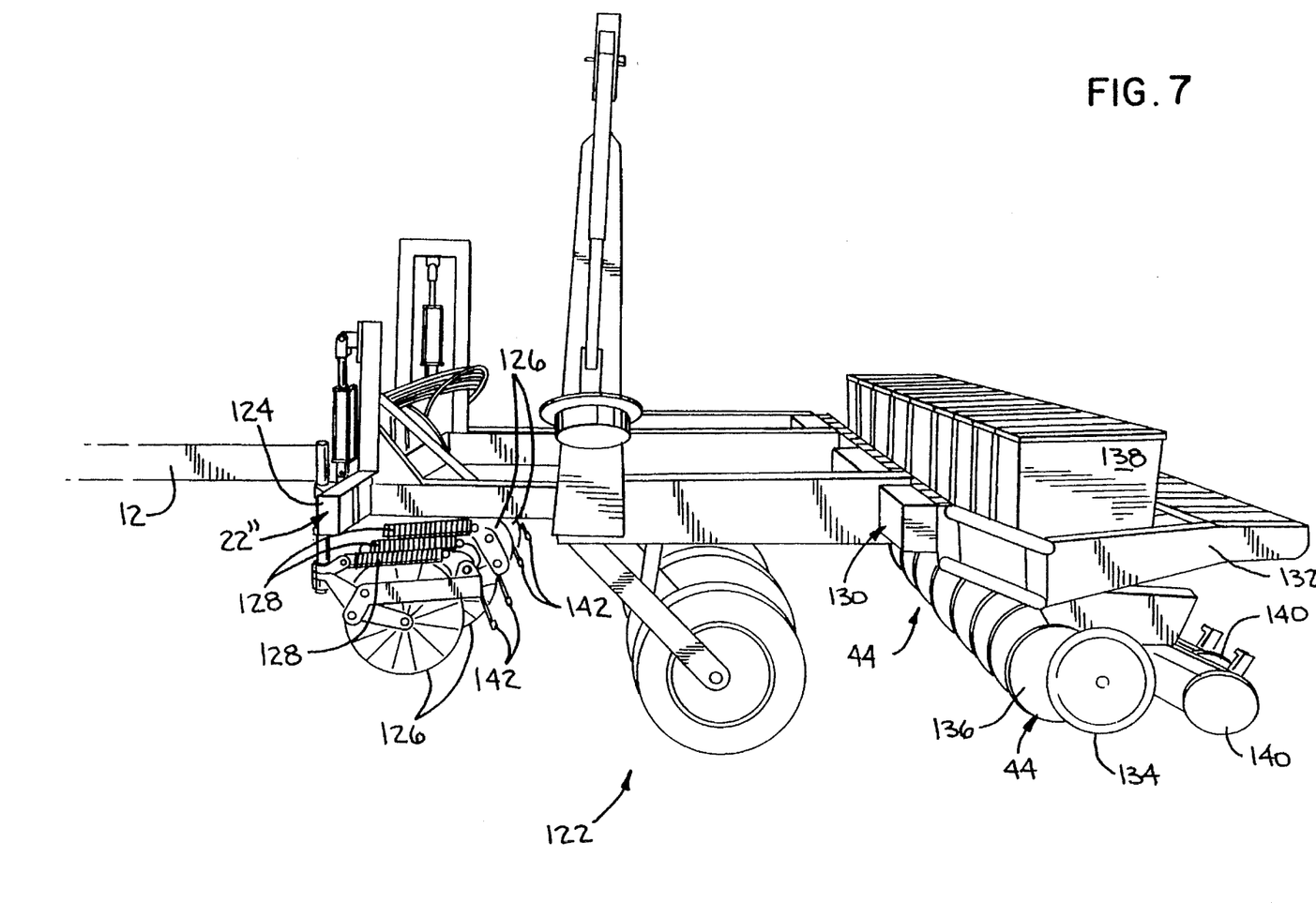
FIG. 7 is a side and top perspective view of the soil treatment apparatus of FIGS. 4–6.

Each coulter wheel is attached in depending fashion from the beam 52 by a mounting stem assembly 54. Each mounting stem assembly 54 includes a cylindrical stem 56 which is slidably received in a bracket 58. The bracket 58 is attached to the beam 52 through bolts 60 which extend through the bracket 58 and a backing plate 62. The bolts 60 are tightened to draw the bracket 58 and backing plate 62 together to thereby cause the backing plate 62 and bracket 58 to captively embrace the beam 52. A locking bolt 63 on the bracket is tightened to fix the stem 56 in a desired position relative to the bracket 58 to set the desired height of the implement 24 on the subframe 22'.

The main frame 12 has a central, upstanding support 64 and upstanding side supports 65,66, to which the individual actuators 36,34,38, respectively, are attached. The central support 64 has an inverted "U" shape with a front leg 68 and a rear leg 70 defining a space 72 therebetween for guided movement of the beam 52. The beam 52 has a width W in the fore and aft direction that is slightly less than the fore and aft dimension of the space 72 so that the beam 52 can move vertically without binding with the support 64. Pads 74,76 of low friction material are provided on the rearwardly facing surface 78 of the front leg 68 and the forwardly facing surface 80 of the rear leg 72 to smoothly guide vertical movement of the beam 52 against and relative to the support 64.

The base 82 of the support 64 has a mounting ear 84 to accept one end 86 of the actuator 36. The actuator 36 has a cylinder 88 with an extensible rod 90 that is attached to an ear 92 on the upper surface of the beam 52. Extension of the rod 90 causes the beam 52 to move downwardly relative to the main frame 12 and the support 64, while retraction of the rod 90 causes elevation of the beam 52.

The actuator 34 is connected to the side support 65 and the actuator 38 connected to the side support 66 in the same fashion as the actuator 36 is connected to the central support 64. A conventional controller 40 causes a rod 94 on the actuator 34 and rod 96 on the actuator 38 to extend and retract simultaneously with the rod 90 on the actuator 36. This results in positive vertical movement of the beam 52 without deviation from horizontal so that all of the implements 24 remain at all times at a uniform depth and in the same orientation.

Another aspect of the invention is the provision of structure to consistently limit vertical movement of the subframe 22 relative to the main frame 12. On the apparatus 50, two such means are shown.

The beam 52, which itself serves as one limiting means, extends laterally across a forwardly extending tongue 98 on the main frame, which attaches to the towing vehicle 14. In the lowermost position for the beam 52, the lower surface 100 of the beam 52 abuts to the upper surface 102 of the tongue 98.

Each of the side supports 65,66 cooperates with a fixed upright 104,106 on the beam 52 as a second means of limiting beam movement. The cooperation between each of the uprights 104,106 and the supports 65,66 is the same and thus description herein will be limited to the exemplary support 66 and cooperating upright 106.

Figure 12:
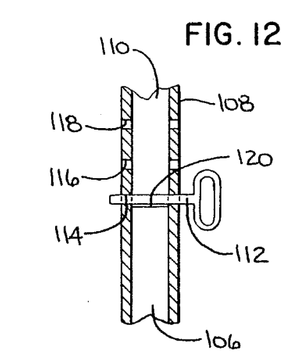
FIG. 12 is a partial cross-sectional view of structure cooperating between the subframe and main frame for limiting relative movement therebetween taken along line 12—12 of FIG. 3.

The upright 66 has a hollow sleeve 108 with an internal space 110 having a square cross-section. The upright 106 is correspondingly configured to move guidingly within the space 110 in a vertical direction. Upward movement of the upright 106 and beam 52 is limited by a removable stop key 112 which projects through the sleeve 108 in any one of three vertically extending bores 114,116,118. The key 112 in FIG. 12 is shown extended through the lowermost bore 114 and, in that position, abuts to the upper surface 120 of the upright 106 with the beam 52 in its uppermost position.

The key 112 can be removed from the bore 114 and placed in either of the bores 116, 118 to vary the upper stop position for the beam 52. This full range may be on the order of six inches.

Other range limiting arrangements are contemplated by the invention. For example, the beam 52 could extend under the tongue 98 so that the tongue 98 defines the stop for the beam 52 in its uppermost position. A stop system such as the cooperating arrangement of the sleeve 108, upright 106 and key 112 can be used to limit downward movement of the beam 52.

In FIGS. 4–7, a soil treatment system, according to the invention, is shown at 122 and has a subframe 22" defined by a single beam 124 with coulter wheels 126 thereon, each preloaded by a coil spring 128. The main frame 12 has a rear portion 130 to which the planters 44 are attached to travel in a trailing direction.

Each planter 44 has a frame 132 supported upon a pair of gauge wheels 134. Upstream of the gauge wheels 134 is a pair of discs 136 (one shown) cooperatively defining a conventional V-opener. The discs 136 open a slot 46 in the soil which accepts seed delivered by gravity from a hopper 138 on the frame 132. Conventional closing wheels 140 replace soil into the slot 46.

With this arrangement, the coulters 126 work the soil upstream of the planters 44. A fertilizer probe 142 downstream of the coulter wheels 126 delivers an additive to the soil 20 behind the coulter wheels 126. The planters 44 then place seed in the treated soil and replace the soil over the slot 46.

The soil treatment apparatus 122 is otherwise substantially the same as the soil treatment apparatus 50, previously described.

Figure 8:
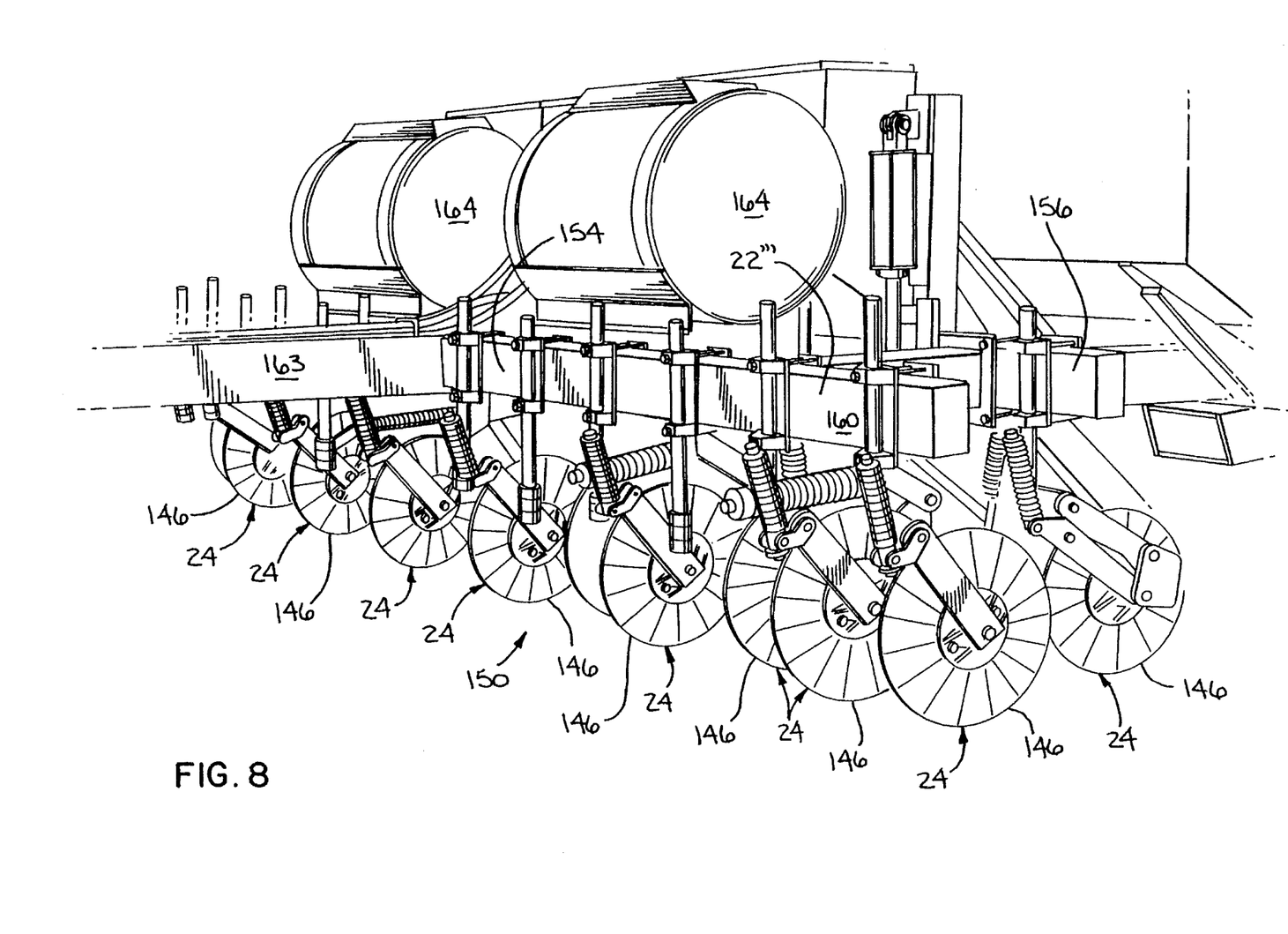
FIG. 8 is a right front perspective view of a portion of a further modified form of soil treatment apparatus according to the present invention.
Figure 9:
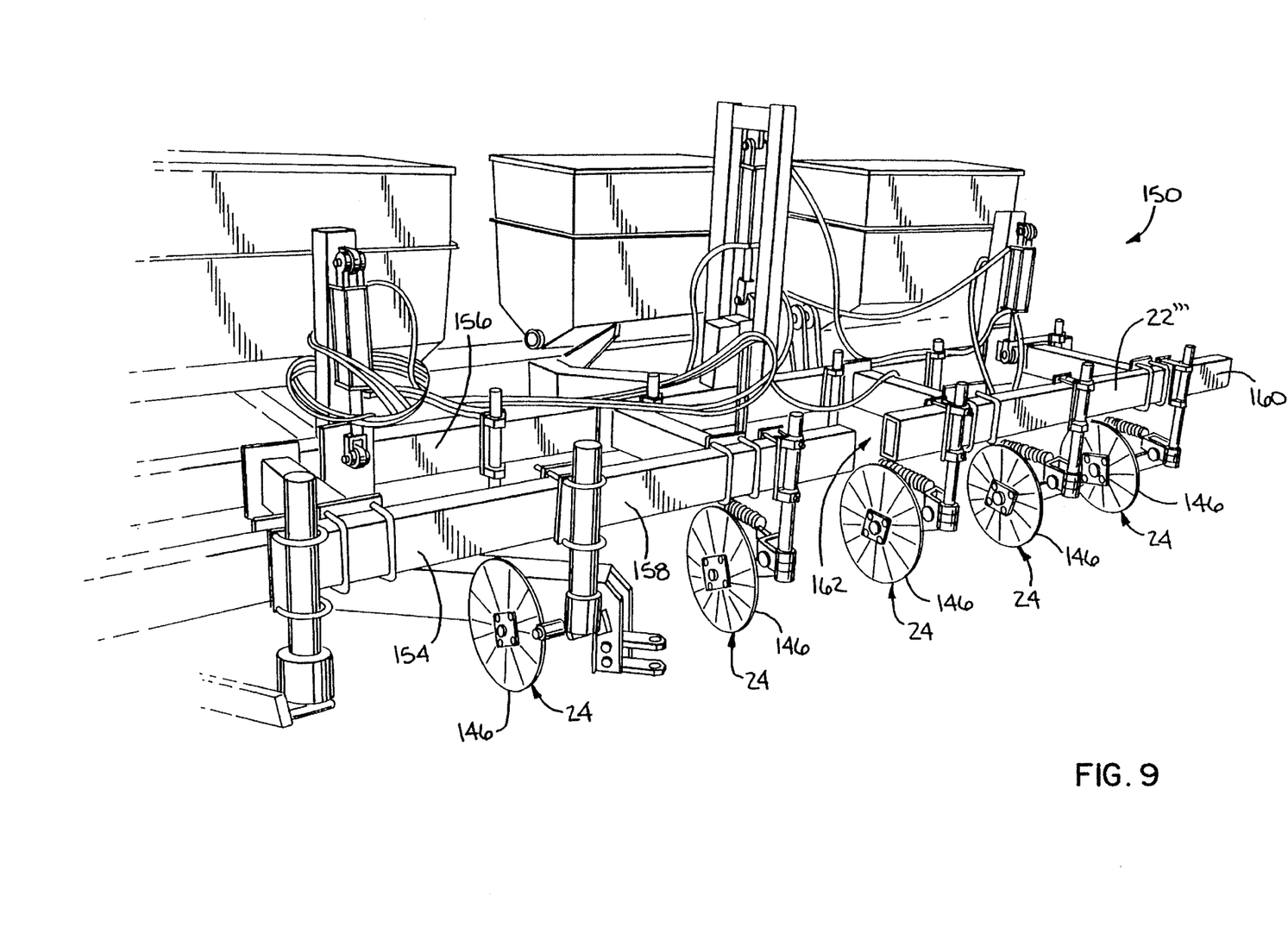
FIG. 9 is a left front perspective view of a portion of the soil treatment apparatus in FIG. 8 with a vehicle mounting tongue removed.
Figure 10:
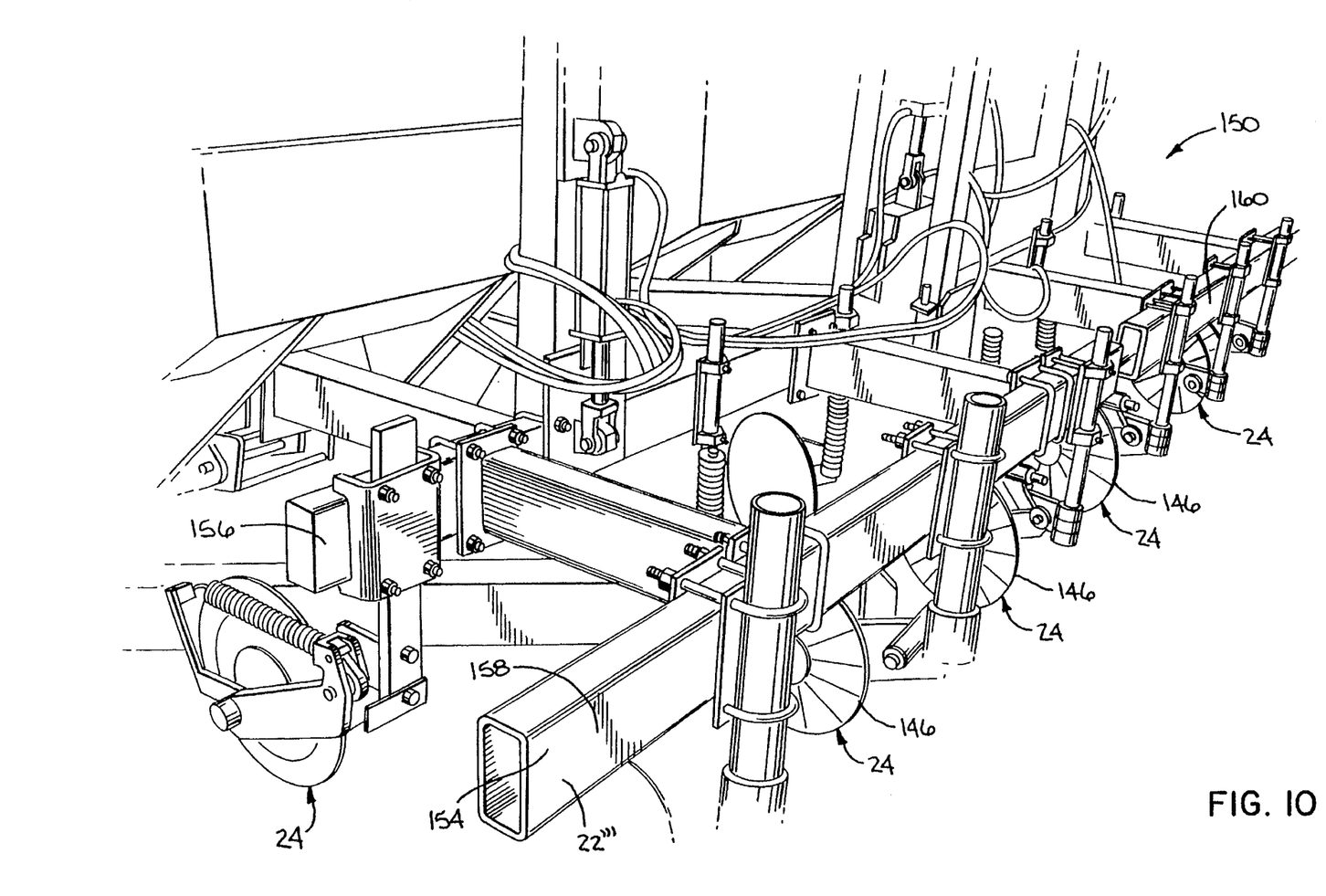
FIG. 10 is a left front perspective view of a portion of the soil treatment apparatus in FIGS. 9 and 10.
Figure 11:
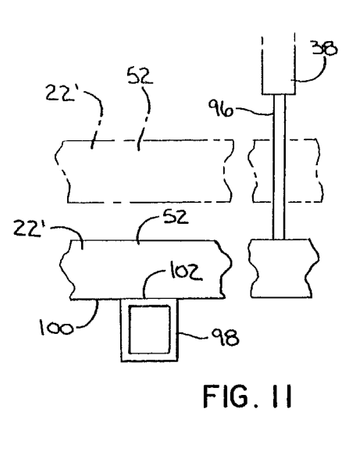
FIG. 11 is a schematic, front elevation view of a portion of a subframe on the soil treatment apparatus of FIGS. 2 and 3 with the subframe in a lowered position in solid lines and in a raised position in phantom lines.

A further modified form of soft treatment apparatus, according to the present invention, is shown at 150 in FIGS. 8–10. The soil treatment apparatus 150 has a subframe 22'" that is substantially the same as the subframe 22 shown in FIG. 1. That is, there is a forward beam 154 and a rear beam 156 with each supporting a plurality of implements 24. The forward beam 154 is defined by separate parts 158,160, with there being an opening 162 therebetween to accommodate the tongue 163 (not shown in FIGS. 9 and 10). The tongue 163 extends rearwardly to attach to the main frame 12.

Additive containers 164 mount at the top of the subframe 152 to allow gravity feed of additive, such as fertilizer, behind the coulter wheels 146.

With the inventive structure, the operator of the vehicle 14 can simply adjust the subframe 22,22',22",22'" to alter the down pressure applied to the soil by the implements 24. This allows the user to maintain a uniform treatment depth by the implements 24 in both hard and soft soil. The user can make this adjustment from the cab 42 to allow treatment of an entire field without exiting the vehicle 14 as to make the conventional, manual down pressure adjustments. At the same time, the user can consistently and predictably set the desired range of vertical travel for the subframe 22 and associated implements 24 so that consistent hard and soft soil adjustments can be set and maintained. The user has the convenience of infinite adjustment of the subframe 22, 22', 22", 22'" between its upper and lower travel limits.

The foregoing disclosure of specific embodiments is intended to be illustrative of the broad concepts comprehended by the invention.

We claim:

1. A soil treatment apparatus comprising:

a main frame to be drawn by a towing vehicle over subjacent soil to be treated;

a subframe;

means for mounting the subframe to the main frame for vertical movement of the subframe relative to the main frame between first and second positions; and means for attaching a plurality of soil treating implements to the subframe so that the plurality of soil treating implements simultaneously follow movement of the subframe between raised and lowered positions as the subframe moves between the first and second positions, there being no means structurally connecting between any of the plurality of soil treating implements and the main frame other than through the subframe, whereby the vertical positions of a plurality of implements on the subframe can be changed simultaneously relative to the main frame.

2. The soil treatment apparatus according to claim 1 wherein the means for mounting the subframe mounts the subframe for translational movement in a straight line relative to the main frame so that the soil treating implements and means for attaching the soil treating implements remain in the same orientation relative to the subframe as the subframe moves between the first and second positions.

3. The soil treatment apparatus according to claim 1 in combination with means cooperating between the main frame and subframe for moving the subframe between its first and second positions.

4. The soil treatment apparatus according to claim 3 wherein the apparatus has a front and rear and laterally spaced sides and the means for moving the subframe comprises first and second laterally spaced actuators.

5. The soil treatment apparatus according to claim 4 including means for operating the first and second actuators from a location remote from the first and second actuators.

6. The soil treatment apparatus according to claim 4 wherein the first and second actuators comprise one of hydraulic and pneumatic actuators.

7. The soil treatment apparatus according to claim 1 in combination with a soil treating implement, said soil treating implement attaching means including a mounting stem assembly depending from the subframe and there are means on at least one of the mounting stem assembly and subframe for biasably urging the first soil treating implement downwardly with a predetermined force.

8. The soil treatment apparatus according to claim 1 including means cooperating between the subframe and main frame for limiting vertical movement of the subframe relative to the main frame.

9. The soil treatment apparatus according to claim 8 wherein the cooperating means for limiting vertical movement comprises means for limiting vertical movement of the subframe relative to the main frame in both a raised position for the subframe and a lowered position for the subframe.

10. The soil treatment apparatus according to claim 1 wherein the soil treatment apparatus has a leading end, a trailing end and laterally spaced sides, there being in combination with the soil treatment apparatus a plurality of means for planting seed in subjacent soil and means for attaching the plurality of means for planting seed to at least one of the subframe and main frame in side-by-side relationship in trailing relationship to the soil treatment apparatus.

11. The soil treatment apparatus according to claim 10 in combination with a plurality of soil treating implements, said soil treating implements including means for applying an additive into subjacent soil.

12. The soil treatment apparatus according to claim 1 wherein the soil treatment apparatus has a front and rear and laterally spaced sides, and the subframe includes first and second laterally extending, elongate beams, said beams being spaced from each other in a fore and aft direction and the means for attaching a plurality of soil treating implements comprises means for attaching a plurality of soil treating implements to each of the first and second beams.

13. The soil treatment apparatus according to claim 9 wherein the cooperating means for limiting vertical movement includes means for selectively changing at least one of the raised and lowered positions in which movement of the subframe is limited.

14. The soil treatment apparatus according to claim 1 wherein the soil treatment apparatus has a front and rear and the main frame has a vertically extending surface that faces in one of a fore and aft direction and guides vertical movement of the subframe relative to the main frame.

15. The soil treatment apparatus according to claim 1 wherein the soil treatment apparatus has a front and rear and laterally spaced sides, the subframe includes an elongate laterally extending beam and the main frame includes a tongue for attachment to a towing vehicle, said tongue extending through the beam in a fore and aft direction.

16. The soil treatment apparatus according to claim 1 wherein the soil treatment apparatus has a front and rear and laterally spaced sides, the subframe includes an elongate laterally extending beam, the main frame includes a tongue extending in a fore and aft direction, and the beam abuts to the tongue to limit one of upward and downward movement of the subframe relative to the main frame.

17. A subframe assembly for a plurality of agricultural implements, said subframe assembly comprising:

a beam;

first means for attaching a plurality of soil treating implements to the beam to follow movement of the beam; and second means for attaching the beam to a main frame for movement of the beam vertically relative thereto between raised and lowered positions, said first and second means comprising means for maintaining the plurality of soil treating implements and first means in the same orientation relative to the beam as the beam moves between the raised and lowered position.

18. The subframe assembly according to claim 17 in combination with a main frame and including means cooperating between the beam and the main frame to move the subframe selectively in a vertical direction relative to the main frame.

19. The combination according to claim 18 wherein the means cooperating between the beam and the main frame comprises first and second spaced actuators.

20. The subframe assembly according to claim 19 in combination with a soil treating implement, said soil treating implement attaching means including a mounting stem assembly depending from the beam and there are means on the mounting stem assembly for biasably urging the first soil treating implement downwardly with a predetermined force.

* * * * *